United States Patent
Chen et al.

(10) Patent No.: US 12,104,284 B2
(45) Date of Patent: *Oct. 1, 2024

(54) CRIMPED MULTI-COMPONENT FIBERS

(71) Applicant: DOW GLOBAL TECHNOLOGIES LLC, Midland, MI (US)

(72) Inventors: Yinglong Chen, Lake Jackson, TX (US); Akanksha Garg, Pearland, TX (US); Yijian Lin, Pearland, TX (US); Sanjib Biswas, Manvel, TX (US); Jeffrey D. Weinhold, Lake Jackson, TX (US); Pavan Kumar Valavala, Missouri City, TX (US); Fabricio Arteaga Larios, Sugarland, TX (US); Jill Martin, Pearland, TX (US); Didem Oner-Deliormanli, Bellaire, TX (US); Mehmet Demirors, Pearland, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 805 days.

This patent is subject to a terminal disclaimer.

(21) Appl. No.: 17/293,202

(22) PCT Filed: Nov. 20, 2019

(86) PCT No.: PCT/US2019/062339
§ 371 (c)(1),
(2) Date: May 12, 2021

(87) PCT Pub. No.: WO2020/106800
PCT Pub. Date: May 28, 2020

(65) Prior Publication Data
US 2022/0049377 A1 Feb. 17, 2022

Related U.S. Application Data

(60) Provisional application No. 62/769,615, filed on Nov. 20, 2018.

(51) Int. Cl.
*D01D 5/32* (2006.01)
*C08F 10/06* (2006.01)
(Continued)

(52) U.S. Cl.
CPC ............ *D01D 5/32* (2013.01); *C08F 10/06* (2013.01); *C08F 210/16* (2013.01); *D01D 5/22* (2013.01);
(Continued)

(58) Field of Classification Search
CPC .......... D01F 6/46; D01F 8/06; D04H 1/4291; D10B 2321/021; C08F 210/16;
(Continued)

(56) References Cited

U.S. PATENT DOCUMENTS 4,547,420 A 10/1985 Krueger et al.
7,927,698 B2 4/2011 Autran et al.
(Continued)

FOREIGN PATENT DOCUMENTS

EP 1745171 A1 1/2007
WO 9916946 A1 4/1999
(Continued)

OTHER PUBLICATIONS

International Search Report for the corresponding International Application No. PCT/US2019/062339; International Filing Date: Nov. 20, 2019, Date of Mailing: Feb. 24, 2020; 7 pages.
(Continued)

*Primary Examiner* — Jennifer A Gillett
(74) *Attorney, Agent, or Firm* — CANTOR COLBURN LLP (57) ABSTRACT

Disclosed is a curly fiber having a fiber centroid and comprising a first region having a first centroid and a second region wherein the first region comprises an ethylene/alpha olefin interpolymer composition in an amount of at least 75
(Continued)

weight percent based on total weight of the first region and wherein the ethylene/alpha olefin interpolymer composition is characterized by a low temperature peak and a high temperature peak on an elution profile via improved comonomer composition distribution (ICCD) procedure, and a full width at half maximum of the high temperature peak is less than 6.0° C. and the second region is a material comprising a polymer which is different from the ethylene/alpha-olefin interpolymer of the first region and wherein the regions are arranged such that at least one of the first centroid and the second centroid is not the same as the fiber centroid.

9 Claims, 2 Drawing Sheets

(51) Int. Cl.
 *C08F 210/16* (2006.01)
 *D01D 5/22* (2006.01)
 *D01F 8/06* (2006.01)

(52) U.S. Cl.
 CPC ............ *D01F 8/06* (2013.01); *C08F 2500/05* (2013.01); *C08F 2500/12* (2013.01)

(58) Field of Classification Search
 CPC ...... C08F 10/06; C08F 4/64193; C08F 2/001; C08F 210/14; C08F 2500/05; C08F 2500/10; C08F 2500/12; C08F 2500/03; C08F 2500/02; C08F 2500/06; C08F 2500/29; D01D 5/32; D01D 5/22; D01D 5/12; D01D 5/30
 See application file for complete search history.

(56) References Cited

U.S. PATENT DOCUMENTS

| | | |
|---|---|---|
| 8,383,730 B2 | 2/2013 | Jaker et al. |
| 9,631,059 B2 | 4/2017 | Demirors et al. |
| 9,688,795 B2 | 6/2017 | Cerk et al. |
| 2007/0014987 A1 | 1/2007 | Usui et al. |
| 2011/0003940 A1 | 1/2011 | Karjala et al. |
| 2011/0165470 A1* | 7/2011 | Dahringer ........... H01M 50/429 428/221 |
| 2011/0172354 A1* | 7/2011 | Claasen ................. C08L 23/04 525/240 |
| 2011/0263801 A1* | 10/2011 | Garoff ................... C08F 210/16 526/116 |
| 2012/0121882 A1 | 5/2012 | Okaya |
| 2013/0134088 A1 | 5/2013 | Dahringer et al. |
| 2013/0190465 A1* | 7/2013 | Demirors ................ C08F 10/00 526/348.2 |
| 2015/0239999 A1 | 8/2015 | Willocq et al. |
| 2015/0274907 A1* | 10/2015 | MacDonald ............ C08L 23/12 526/348 |
| 2018/0273708 A1* | 9/2018 | Kikuchi ................. A61L 27/16 |

FOREIGN PATENT DOCUMENTS

| | | |
|---|---|---|
| WO | 9916947 A1 | 4/1999 |
| WO | 2005111291 A1 | 11/2005 |
| WO | 2009111185 A2 | 9/2009 |
| WO | 2017040127 A1 | 3/2017 |

OTHER PUBLICATIONS

Written Opinion for the corresponding International Application No. PCT/US2019/062339; International Filing Date: Nov. 20, 2019, Date of Mailing: Feb. 24, 2020; 8 pages.

* cited by examiner

CRIMPED MULTI-COMPONENT FIBERS

CROSS-REFERENCE TO RELATED APPLICATIONS

This application is a National Stage application of PCT/US2019/062339, filed Nov. 20, 2019, which claims benefit of U.S. Application No. 62/769,615 filed on Nov. 20, 2018, both of which are incorporated by reference herein in their entirety.

FIELD OF THE INVENTION

The field of the invention is crimped or curly fibers of ethylene/alpha-olefin polymers.

BACKGROUND

Polyethylene based fibers are used in consumer products, especially non-woven fabrics. Such fibers are desirable due its drape-ability and smoothness. Non-woven fabrics have numerous applications, such as filters, disposable materials in medical applications, and diaperstock. To reduce weight of the final product, crimping or curling of the fiber has been proposed.

There remains a desire to form fibers having enhanced curliness (also known as crimp) and to be able to do so efficiently.

SUMMARY OF THE INVENTION

Disclosed herein is a multi-component fiber that shows a unique and unexpected degree of curliness or crimp as compared to multi-component fibers having different constituent polyethylene based materials.

Specifically, disclosed herein is a curly fiber having a fiber centroid and comprising a first region having a first centroid and a second region having a second centroid wherein the first region comprises an ethylene/alpha olefin interpolymer composition in an amount of at least 75 weight percent based on total weight of the first region and wherein the ethylene/alpha olefin interpolymer composition is characterized by a low temperature peak and a high temperature peak on an elution profile via improved comonomer composition distribution (ICCD) procedure, and a full width at half maximum of the high temperature peak is less than 6.0° C. and the second region is a material comprising a polymer which is different from the ethylene/alpha-olefin interpolymer of the first region and wherein the regions are arranged such that the at least one of the first centroid and the second centroid is not the same as the fiber centroid.

As used herein fiber centroid means the arithmetic mean of all the points of a cross-section of the fiber. For a region, the centroid means the arithmetic mean of all the points of the region when viewed in a cross-section of the fiber.

DETAILED DESCRIPTION OF THE INVENTION

Disclosed herein is a curly multi-component fiber having at least first and second regions. The fiber may be characterized as eccentric (i.e. a cross section of the fiber is not symmetric in at least one perspective, e.g. it cannot be concentric core/sheath or the like).

The fibers can be bicomponent fibers. The fibers can have three or more components. The fibers can have a core sheath configuration wherein a cross section of the fiber shows one region, a core, surrounded by another region, a sheath. In a multi-component fiber, there can be one or more inner cores, one or more an inner sheaths and an outer sheath. The fibers can have a side by side configuration. The fibers can have a segmented pie configuration wherein a cross section of the fiber shows one region occupying a portion, for example a quarter, a third, a half of the cross section and a second region occupies the remainder of the cross section. In a multi-component fiber, a third or fourth region can occupy a portion of the pie cross section. In a multi-component fiber, a core sheath configuration can be combined with a segmented pie. For example, the core can have two components in a segmented pie structure surrounded by a sheath. In a multi-component system a third component can be contained within a first or second region in an island in sea configuration. For example, a third component may form discrete regions within a first region that forms a core and is surrounded by a sheath.

Figure 2:
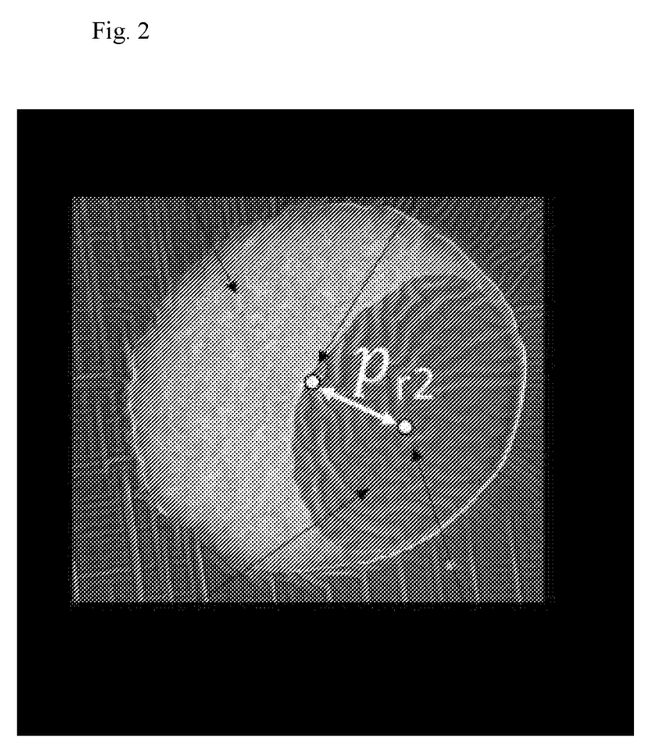
FIG. 2 is a scanning electron micrograph (SEM) cross-section image of a highly eccentric core sheath structure fiber made with the resin of Sample 1 in sheath and polypropylene in core.

The fiber has a centroid and each region of the fiber has its own centroid. As used herein centroid means the arithmetic mean of all the points of the region of a cross-section of the fiber. For a concentric core sheath, the fiber, the core region and the sheath region have substantially the same centroid. The fiber centroid and the centroid of the either first region or the second region or both can be different. At least two of the regions can have different centroids. These latter structures are also referred to as eccentric configurations. The centroid of the fiber can be designated as $C_f$ and the centroid of a region can be designated as $C_{rx}$, where x is a designation of the region. For example, the first region has a centroid, $C_{r1}$. The average distance from $C_f$ to the outside surface of the fiber is "r" which can be calculated as $\sqrt{A/\pi}$, where A is the area of the fiber cross-section. FIG. 2 illustrate the fiber centroid and the centroid of the second region using a fiber made with the polymer of Sample 1 as sheath and polypropylene (PP) as core at 20 psi slot aspirator pressure. The distance from a region centroid to the fiber centroid is "$P_{rx}$". "$P_{rx}/r$" is defined as the centroid offset. The centroid offset of at least one of the first or second region can be at least 0.1 or at least 0.2 or at least 0.3 or at least 0.4 and can be less than 1 or less than 0.9.

The inventors have found that use of a specific ethylene/alpha-olefin interpolymer composition as described herein in one of the regions enhances curl. The fiber comprises a different polymer in one of the other regions.

Ethylene/Alpha-Olefin Interpolymer

A key feature of the non-woven fabric are that fibers made with a specific ethylene/alpha-olefin interpolymer composition. By interpolymer is meant that the polymer is a polymer of two, three or more monomers i.e. a copolymer, terpolymer, etc. In this case the first monomer is ethylene. The second monomer is an alpha olefin. Such alpha olefins have at least 3 carbon atoms, and, for example, can have up to 20, or up to 10 or up to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. Optional third, fourth, or more monomers may be alpha-olefins. The interpolymer compositions are bimodal and can be conveniently made by combining two ethylene/alpha olefin interpolymers having different molecular weights and/or different densities and/or at least two different peaks in ICCD elution as described in more detail below.

The interpolymers can be random interpolymers. The interpolymer can comprise at least 50 mole percent or at least 60 mole percent or at least 70 mole percent of ethylene based repeat units based on total moles of repeat units in the interpolymer. The interpolymer can comprise no more than 99.9 or no more than 99.5 or no more than 99, or no more than 95, or no more than 90 or no more than 85 mole percent ethylene based repeat units based on total moles of repeat units in the interpolymer. The interpolymer can comprise at least 0.1 or at least 0.5 or at least 1 or at least 5 or at least 10 mole percent of alpha olefin based repeat units based on total moles of repeat units in the interpolymer (i.e. the second and optional third and fourth monomers). The interpolymer can comprise no more than 50 or no more than 30 mole percent of alpha olefin based repeat units based on total moles of repeat units in the interpolymer (i.e. the second and optional third and fourth monomers).

These ethylene/alpha olefin interpolymer compositions can be characterized by a density of at least 0.930 g/cm³ and no more than 0.965 g/cm3 or no more than 0.940 g/cm³. Density is measured according to ASTM D792. Bicomponent fibers comprising the disclosed ethylene/alpha olefin interpolymer, show good curl. The bimodal polymer compositions can be characterized by a lower density fraction having a density in the range of about 0.900 to about 0.940 g/cm³ and a higher density fraction having a density of at least about 0.950 g/cm³.

These ethylene/alpha-olefin interpolymer compositions can be characterized by a melt index (I2) in the range of from 10 to 60 g/10 minutes, wherein the 12 is measured according to ASTM D1238, 190° C., 2.16 kg. The ratio of the I10/I2 can be less than 6.9 or less than 6.8 or less than 6.7, wherein 110 is measure according to ASTM D1238, 190° C., 10 kg. Lower 110/12 ratio can indicate lower long chain branching that leads to better spinnability/processability.

These ethylene/alpha-olefin interpolymer compositions can be characterized by a molecular weight distribution by the method set forth below, expressed as the ratio of the weight average molecular weight to number average molecular weight ($M_{w(GPC)}/M_{n(GPC)}$) in the range of no more than 2.6 or no more than 2.5 and at least 1.5 or at least 1.7 or at least 2.0. Interpolymer compositions having a molecular weight distribution in this range are believed to have better processability (e.g. fiber spinning) than interpolymers having a higher molecular weight distribution. The ethylene/alpha olefin interpolymer can be characterized by a $M_{w(GPC)}/M_{n(GPC)}$ greater than (I10/I2)–4.63.

The ethylene/alpha-olefin interpolymer compositions can have a weight average molecular weight from a lower limit of 15,000 g/mol, 20,000 g/mol, or 30,000 g/mol to an upper limit of 100,000 g/mol 120,000 g/mol, or 150,000 g/mol. The $M_{z(GPC)}/M_{w(GPC)}$ can be less than 3.0 or less than 2.0 and can be more than 1.0. The bimodal polymer composition can show two peaks in ICCD elution profile. In that instance, the higher temperature fraction can have a peak position molecular weight of no more than 70,000 g/mol, or no more than 50,000 g/mol. The higher temperature fraction can have a peak position molecular weight of at least 15,000 or at least 20,000 g/mol. The lower temperature fraction can have a peak position molecular weight of at least 30,000 or at least 40,000 or at least 50,000 g/mol. The lower temperature fraction can have a peak position molecular weight of no more than 250,000 or no more than 200,000 or no more than 150,000 g/mol.

These ethylene/alpha-olefin interpolymer compositions can be characterized by a tan delta (tan δ) at 1 radian/second of at least 45 or at least 50. The ethylene/alpha-olefin interpolymers can be characterized by a ratio of tan delta at 1 radian/second and 190° C. to tan delta at 100 radians/second and 190° C. of at least 12. These characteristics may be measured by dynamic mechanical spectroscopy (DMS).

These ethylene/alpha-olefin interpolymer compositions can be characterized by at least two distinguishable peaks between 35° C. to 110° C. on the elution profile of improved comonomer composition distribution (ICCD) with a distinct valley (drop of at least 10% compared to the peak height of the smaller peak) between the peaks, wherein the peak positions must be separated by a minimum of 10° C. Each peak is separated by a vertical line at the lowest height point of the adjoining valley.

The peak temperature of the lower temperature peak can be at least 50° C. or at least 60° C. and can be less than 90° C. or less than 75° C. The peak temperature of the higher temperature peak can be at least 90° C. or at least 95° C. and can be less than 110° C. or less than 105° C. or less than 100° C. The inventors have found that lower temperature peaks in the range of 50 to 75° C. are particularly useful in making highly curled fibers.

The weight fraction of the low temperature peak fraction can be at least 25 or at least 30 and less than 65 or less than 60 or less than 55 weight percent based on total weight of the eluted polymer. The weight fraction of the high temperature peak fraction can be at least 35 or at least 40 or at least 45 and no more than 75 weight percent based on total weight of the eluted polymer.

The full width at half maximum of the high temperature peak can be less than 6.0° C. A narrow peak for the high density fraction denotes a narrower composition distribution without ultra-high or ultra-low molecular weight species that could impede spinning performance or create extractables.

The ethylene/alpha olefin composition can have a composition distribution breadth index (CDBI) of less than 0.5 (i.e. less than 50%), less than 0.3 (30%), less than 0.25 (25%), less than 0.22 (22%) or less than 0.2 (20%).

The ethylene/alpha-olefin interpolymer composition can have a comonomer distribution constant (CDC) of less than 100, preferably 30-80.

The ethylene/alpha-olefin interpolymer compositions can be characterized by molecular weighted comonomer distribution index (MWCDI) of greater than 0.20, or greater than 0.25 or greater than 0.30 or greater than 0.35, or greater than 0.40 or greater than 0.45 or greater than 0.50. MWCDI is a measure of the slope of comonomer incorporation as a function of molecular weight obtained from conventional gel permeation chromatography. If MWCDI is greater than 0.25 (between a molecular weight range of 20,000 and 200,000 g/mol), the resin structure is viewed as having a significant reverse comonomer incorporation with more comonomer on the higher molecular weight side of the distribution.

The ethylene/alpha olefin interpolymer compositions disclosed herein can be characterized by low amounts of long chain branching (LCB). This can be indicated by low zero shear viscosity ratios (ZSVR). Specifically, the ZSVR can be less than 1.35 or no more than 1.30. The ZSVR can be at least 1.10.

The ethylene/alpha olefin interpolymer compositions can be characterized by a vinyl saturation number per 1,000,000 carbon atoms of less than 230, or less than 210, or less than 190, or less than 170, or less than 150 as determined by $^1$H-NMR.

Any conventional polymerization processes may be employed to produce the ethylene/α-olefin interpolymer composition. Such conventional polymerization processes include, but are not limited to, solution polymerization process, using one or more conventional reactors e.g. loop reactors, isothermal reactors, stirred tank reactors, batch reactors in parallel, series, and/or any combinations thereof. Such conventional polymerization processes also include gas-phase, solution or slurry polymerization or any combination thereof, using any type of reactor or reactor configuration known in the art.

In general, the solution phase polymerization process occurs in one or more well-mixed reactors such as one or more isothermal loop reactors or one or more adiabatic reactors at a temperature in the range of from 115 to 250° C.; for example, from 115 to 200° C., and at pressures in the range of from 300 to 1000 psi; for example, from 400 to 750 psi. In one example, in a dual reactor, the temperature in the first reactor is in the range of from 115 to 190° C., for example, from 115 to 150° C., and the second reactor temperature is in the range of 150 to 200° C., for example, from 170 to 195° C. In another example, in a single reactor, the temperature in the reactor is in the range of from 115 to 190° C., for example, from 115 to 150° C. The residence time in solution phase polymerization process is typically in the range of from 2 to 30 minutes; for example, from 10 to 20 minutes. Ethylene, solvent, hydrogen, one or more catalyst systems, optionally one or more co-catalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Tex. The resultant mixture of the ethylene/alpha-olefin interpolymer and solvent is then removed from the reactor and the ethylene/alpha-olefin interpolymer is isolated. Solvent is typically recovered via a solvent recovery unit, i.e. heat exchangers and vapor liquid separator drum, and is then recycled back into the polymerization system.

The ethylene/α-olefin interpolymer composition can be produced via solution polymerization in a dual reactor system, for example a dual loop reactor system, wherein ethylene and optionally one or more α-olefins are polymerized in the presence of one or more catalyst systems. Additionally, one or more co-catalysts may be present.

The ethylene/alpha-olefin interpolymers can be produced via solution polymerization in a single reactor system, for example a single loop reactor system, wherein ethylene and optionally one or more α-olefins are polymerized in the presence of one or more catalyst systems. Two different catalysts can be used in a dual reactor system. One or both of the two different catalysts have the formula (I) as shown below. This allows for manufacture of the bimodal interpolymer compositions as described above.

An exemplary catalyst system suitable for producing the first ethylene/a olefin interpolymer can be a catalyst system comprising a procatalyst component comprising a metal-ligand complex of formula (I):

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$), or —P($R^P$)—; L is ($C_1$-$C_{40}$)hydrocarbylene or ($C_1$-$C_{40}$)heterohydrocarbylene, wherein independently each $R^N$ and $R^P$ is ($C_1$-$C_{30}$)hydrocarbyl or ($C_1$-$C_{30}$)heterohydrocarbyl, and wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$)heterohydrocarbyl; $R^1$ and $R^8$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

(IV)

In formulas (II), (III), and (IV), each of $R^{31-35}$, $R^{41-48}$, or $R^{51-59}$ is independently chosen from $(C_1-C_{40})$hydrocarbyl, $(C_1-C_{40})$heterohydrocarbyl, $—Si(R^C)_3$, $—Ge(R^C)_3$, $—P(R^P)_2$, $—N(R^N)_2$, $—N=CHR^C$, $—OR^C$, $—SR^C$, $—NO_2$, $—CN$, $—CF_3$, $RCS(O)—$, $R^CS(O)_2—$, $(R^C)_2C=N—$, $R^CC(O)O—$, $R^COC(O)—$, $R^CC(O)N(R^N)—$, $(R^N)_2NC(O)—$, halogen, or —H, provided at least one of $R^1$ or $R^8$ is a radical having formula (II), formula (III), or formula (IV) where $R^C$, $R^N$, and $R^P$ are as defined above.

In formula (I), each of $R^{2-4}$, $R^{5-7}$, and $R^{9-16}$ is independently selected from $(C_1-C_{40})$hydrocarbyl, $(C_1-C_{40})$heterohydrocarbyl, $—Si(R^C)_3$, $—Ge(R^C)_3$, $—P(R^N)_2$, $—N(R^N)_2$, $—N=CHR^C$, $—OR^C$, $—SR^C$, $—NO_2$, $—CN$, $—CF_3$, $R^CS(O)—$, $R^CS(O)_2—$, $(R^C)_2C=N—$, $R^CC(O)O—$, $R^COC(O)—$, $R^CC(O)N(R^N)—$, $(R^C)_2NC(O)—$, halogen, and —H where $R^C$, $R^N$, and $R^P$ are as defined above.

The catalyst system comprising a metal-ligand complex of formula (I) may be rendered catalytically active by any technique known in the art for activating metal-based catalysts of olefin polymerization reactions. For example, the comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 $(C_1-C_{20})$hydrocarbyl substituents as described herein. Examples of Group 13 metal compounds include tri$((C_1-C_{20})$hydrocarbyl)-substituted-aluminum compounds or tri$((C_1-C_{20})$hydrocarbyl)-boron compounds. Additional examples of, Group 13 metal compounds are tri(hydrocarbyl)-substituted-aluminum, tri $((C_1-C_{20})$hydrocarbyl)-boron compounds, tri$((C_1-C_{10})$alkyl) aluminum, tri$((C_6-C_{18})$aryl)boron compounds, and halogenated (including perhalogenated) derivatives thereof. Other examples of Group 13 metal compounds are tris(fluoro-substituted phenyl)boranes, tris(pentafluorophenyl)borane. An activating co-catalyst can be a tris$((C_1-C_{20})$hydrocarbyl borate (e.g. trityl tetrafluoroborate) or a tri$((C_1-C_{20})$hydrocarbyl)ammonium tetra$((C_1-C_{20})$hydrocarbyl)borane (e.g. bis(octadecyl)methylammonium tetrakis(pentafluorophenyl)borane). As used herein, the term "ammonium" means a nitrogen cation that is a $((C_1-C_{20})$hydrocarbyl$)_4N^+$ a $((C_1-C_{20})$hydrocarbyl$)_3N(H)^+$, a $((C_1-C_{20})$hydrocarbyl$)_2N(H)_2^+$, $(C_1-C_{20})$hydrocarbylN(H)$_3^+$, or N(H)$_4^+$, wherein each $(C_1-C_{20})$hydrocarbyl, when two or more are present, may be the same or different.

Combinations of neutral Lewis acid activators (co-catalysts) include mixtures comprising a combination of a tri$((C_1-C_4)$alkyl)aluminum and a halogenated tri$((C_6-C_{18})$ aryl)boron compound, especially a tris(pentafluorophenyl) borane. Other examples are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] can be from 1:1:1 to 1:10:30, or from 1:1:1.5 to 1:5:10.

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(1⁻) amine, and combinations thereof.

One or more of the foregoing activating co-catalysts can be used in combination with each other. A preferred combination is a mixture of a tri$((C_1-C_4)$hydrocarbyl)aluminum, tri$((C_1-C_4)$hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. The ratio can be at least 1:5000, or at least 1:1000; and can be no more than 10:1 or no more than 1:1. When an alumoxane alone is used as the activating co-catalyst, preferably the number of moles of the alumoxane that are employed can be at least 100 times the number of moles of the metal-ligand complex of formula (I). When tris(pentafluorophenyl)borane alone is used as the activating co-catalyst, the number of moles of the tris(pentafluorophenyl) borane that can be employed to the total number of moles of one or more metal-ligand complexes of formula (I) range from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

The Fibers.

The ethylene/alpha-olefin interpolymer as described above either alone or in combination with other materials forms a first region of the fiber.

At least 75%, at least 80%, at least 85%, at least 90%, at least 95%, at least 97%, at least 98%, at least 99%, or at least 100% (all percents being by weight based on total weight of the first region) of the first region of the fiber can be the ethylene/alpha-olefin interpolymer. The remainder of the first region may be additional components such as one or more other polymers and/or one or more additives Other polymers could be another polyethylene (e.g. polyethylene homopolymer or ethylene/alpha-olefin interpolymer), propylene-based polymer (e.g. polypropylene homopolymer, propylene-ethylene copolymer, or propylene/alpha-olefin interpolymer). The amount of the other polymer may be up to 25% Potential additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The ethylene alpha-olefin interpolymer polymer composition may contain from about 0.01 or from about 0.1 or from about 1 to about 25 or to about 20 or to about 15 or to about 10 percent by the combined weight of such additives, based on the weight of the ethylene-based polymer composition including such additives.

The inventive fibers may include the ethylene/alpha-olefin interpolymer composition according to the instant invention as an outer layer, e.g. sheath, alone or in combination with one or more polymers. The term outer layer, as used herein, refers to at least any portion of the fiber surface. The inventive fibers may include the ethylene/alpha-olefin interpolymer composition according to the instant invention as an inner layer, e.g. core, alone or in combination with one or more polymers. The inventive fibers may include the ethylene/alpha-olefin interpolymer adjacent to in a side by side or segmented pie with the second region.

The second region comprises a polymeric composition that is distinct from the ethylene/alpha olefin interpolymer. For example, the second region may comprise a different polyolefin, such as polpropylene, or a polyester such as polyethylene terephthalate or polybutylene terephthalate or combinations thereof with or without additives as described above. The second region preferably comprises at least 75 or at least 80 or at least 85 or at least 90 or at least 99 weight percent of the polymeric material with the remainder of the second region may be additional components such as additives. Potential additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The ethylene/alpha-olefin interpolymer polymer composition may contain from about 0.01 or from about 0.1 or from about 1 to about 25 or to about 20 or to about 15 or to about 10 weight percent by the combined weight of such additives, based on the weight of the ethylene-based polymer composition including such additives.

The first region can be at least 20 or at least 30 or at least 40 or at least 50 or at least 60 or at least 70 or at least 80% by weight of the fiber. The first region can be up to 80 or n up to 70 or up to 60 or up to 50 or up to 40 or up to 30 or up to 20 weight % of the fiber. In a bi-component fiber, the second region can be at least 20 or at least 30 or at least 40 or at least 50 or at least 60 or at least 70 or at least 80% by weight of the fiber and up to 80 or up to 70 or up to 60 or up to 50 or up to 40 or up to 30 or up to 20 weight % of the fiber. Alternatively, the weight ratio of the first component or region to the second component or region can be at least 20/80 or at least 30/70 or at least 40/60 and is no more than 80/20 or no more than 70/30 or no more than 60/40.

The fibers as taught herein may be formed by any conventional spinning technique including melt spinning. The ethylene-based polymer composition is formed into bi-component fibers via different techniques, for example, via melt spinning. Such monocomponent fibers may be continuous filaments, or in the alternative, may be staple fibers. Continuous filaments may further be crimped and/or stretched, and then cut to produce staple fibers. The staple fibers may have lengths of, for example, having lengths of, for example, at least 0.2 or at least 0.5 or at least 1 cm and no more than 16 or no more than 12 or no more than 10 cm.

In melt spinning, the ethylene/alpha-olefin interpolymer composition or the blend of the ethylene/alpha-olefin interpolymer composition and one or more other polymers are melted, coextruded and forced through the fine orifices in a metallic plate called spinneret into air or other gas, where it is cooled and solidified forming the inventive bi-component fibers. The solidified filaments may be drawn off via air jets, rotating rolls, or godets, and can be laid on a conveyer belt as a web.

The inventive bi-component fibers according to the present invention may be formed into non-woven fabrics. The non-woven fabrics according to the instant invention may be fabricated via different techniques. Such methods include, but are not limited to, spunbond process, carded web process, airlaid process for laying the web and bonded by methods including but not limited to thermo-calendering process, adhesive bonding process, hot air bonding process, needle punch process, hydroentangling process, electrospinning process, and combinations thereof. The fabrics can be further laminated to other non-wovens or films in a variety of lamination techniques such as adhesive lamination, thermal lamination, extrusion lamination, needlepunching, hydroentangling and combinations thereof. Advantageously, the non-woven disclosed herein may be formed directly from the constituent polymer material(s) by spunbond processing. In spunbond process, the fabrication of non-woven fabric includes the following steps: (a) extruding strands of one or more polymeric compositions from a spinneret; (b) quenching the strands of the one or more polymeric compositions with a flow of air which is generally cooled in order to hasten the solidification of the molten strands of the one or more polymeric compositions; (c) attenuating the filaments by advancing them through the quench zone with a draw tension that can be applied by either pneumatically entraining the filaments in an air stream or by wrapping them around mechanical draw rolls of the type commonly used in the textile fibers industry; (d) collecting the drawn strands into a web on a foraminous surface, e.g. moving screen or porous belt; and (e) bonding the web of loose strands into the non-woven fabric. Bonding can be achieved by a variety of means including, but not limited to, thermo-calendering process, adhesive bonding process, hot air bonding process, needle punch process, hydroentangling process, and combinations thereof.

The fibers as disclosed herein have the following characteristics:

The fibers may have diameters of at least 3 microns, or at least 5 microns or at least 10 microns and less than 50 microns, or less than 30 microns.

The fibers may have a denier in a denier per filament in the range of less than 50 g/9000 m. All individual values and subranges from less than 50 g/9000 m are included herein and disclosed herein; for example, the denier per filament can be from a lower limit of 0.1, 0.5, 1, 5, 10, 15, 17, 20, 25, 30, 33, 40, or 44 g/9000 m to an upper limit of 0.5, 1, 5, 10, 15, 17, 20, 25, 30, 33, 40, 44, or 50 g/9000 m. For example, the fibers may have a denier per filament in the range of less than 40 g/9000 m; or in the alternative, the fibers may have a denier per filament in the range of less than 30 g/9000 m; or in the alternative, the fibers may have a denier per filament in the range of less than 20 g/9000 m; or in the alternative, the fibers may have a denier per filament in the range of the range of less than 10 g/9000 m; or in the alternative, the fibers may have a denier per filament in the range from 0.5 to 10 g/9000 m.

The non-wovens as disclosed herein can have the following characteristics:

The fabrics as disclosed herein provide relatively high curl. The low levels of vinyl unsaturations in the ethylene-based polymer composition are also important because such low levels of the vinyl unsaturations provide the instant ethylene-based polymer composition with improved processability.

The spunbond non-woven fabrics can be formed into multilayer or laminate structures. Such multilayer structures comprise at least 2 or more layers, wherein at least one or more layers are spunbond non-woven as disclosed herein, and one or more other layers are selected from one or more melt blown non-woven layers, one or more wet-laid non-woven layers, one or more air-laid non-woven layers, one or more webs produced by any non-woven or melt spinning process, one or more film layers. Such as cast film, blown film, one or more coating layers derived from a coating composition via, for example, extrusion coating, spary coating, gravure coating, printing, dipping, kiss rolling, or blade coating. The laminate structures can be joined via any number of bonding methods; thermal bonding, adhesive lamination, hydroentangling, needlepunching. Structures can range from S to SX, or SXX, or, SXXX, or SXXXX, or SXXXXX, where S is the non-woven as disclosed herein and X can be a film, coating, or other non-woven material in any combination or one or more of X could also be S. Additional spunbond layers can be made from the ethylene-based polymer composition, as described herein, and optionally in combinations with one or more polymers and/or additives.

In the case of the staple or binder fibers, the fibers can be mixed with a variety of other fibers including synthetic fibers such as polyethylene (PE), PP, polyethylene terephthalate (PET), or natural fibers such as cellulose, rayon, or cotton. These fibers can be wet laid, air laid or carded into a non-woven web. The non-woven web can then be laminated to other materials.

The spunbond non-woven fabrics can be used in various end-use application including, but not limited to, hygiene absorbent products such diapers, feminine hygiene articles, adult incontinence products, wipes, bandages and wound dressings, and disposable slippers and footwear, medical application such isolation gowns, surgical gowns, surgical drapes and covers, surgical scrub suits, caps, masks, and medical packaging.

The fibers can be characterized by a curvature (the inverse of radius of curve) of at least 2 or at least 2.5 or at least 3 $mm^{-1}$. For example, fibers having the ethylene/alpha-olefin interpolymer as described herein as a sheath on a polypropylene core can have a curvature of at least 2, or at least 2.5 or at least 3 when extruded at a temperature of 230 to 250° C. (preferably about 240° C.) through a die having a length to diameter ratio of about 4/1 at a pressure of about 0.1 to 0.3 (or 0.14 to 0.28) MPa. Under those conditions curvatures can be up to 15 or 12 $mm^{-1}$. As another example fibers having the ethylene/alpha-olefin interpolymer as described herein as a sheath on a polypropylene core can have a curvature of at least 2 when extruded at a temperature of 200 to 220° C. (preferably about 210° C.) through a die having a length to diameter ratio of about 4/1 at a pressure of about 0.1 to 0.3 (or 0.14 to 0.28) MPa.

Testing Methods

Density

Density measurements for the ethylene/alpha-olefin interpolymers were made in accordance with ASTM D792, Method B.

Melt Index (I2) and (I10)

Melt index (I2) values for the ethylene/alpha-olefin interpolymers are measured in accordance with ASTM D1238 at 190° C. at 2.16 kg. Similarly, melt index (I10) values for the ethylene/alpha-olefin interpolymers are measured in accordance with ASTM D1238 at 190° C. at 10 kg. The values are reported in g/10 min, which corresponds to grams eluted per 10 minutes.

Dynamic Mechanical Spectroscopy (DMS)

Samples are compression-molded into 3 mm thick×25 mm diameter circular plaque at 177° C. for five minutes, under 10 MPa pressure. The sample are then taken out of the press and placed on a countertop to cool. Constant temperature, frequency sweep measurements are performed on the compression molded plaques with an ARES strain controlled rheometer (TA Instruments), equipped with 25 mm parallel plates, under a nitrogen purge. For each measurement, the rheometer is thermally equilibrated, for at least 30 minutes, prior to zeroing the gap. The sample disk is placed on the plate, and allowed to melt for five minutes at 190° C. The plates are then closed to 2 mm gap, the sample is trimmed, and then the test is started. The method can have an additional five minute delay built in, to allow for temperature equilibration. The experiments are performed at 190° C., over a frequency range from 0.1 to 100 radian/second, at five points per decade interval. The strain amplitude is constant at 10%. The stress response is analyzed in terms of amplitude and phase, from which the storage modulus (G'), loss modulus (G"), complex modulus (G*), dynamic viscosity ($\eta$*), and tan $\delta$ (or tan delta) are calculated. Tan delta at 1 radian/second and tan delta at 100 radian/second are obtained.

Improved Comonomer Composition Distribution (ICCD)

The Improved Comonomer Composition Distribution (ICCD) test is performed with Crystallization Elution Fractionation instrumentation (CEF) (PolymerChar, Spain) equipped with IR-5 detector (PolymerChar, Spain) and two-angle light scattering detector Model 2040 (Precision Detectors, currently Agilent Technologies). The ICCD column is packed with gold coated nickel particles (Bright 7GNM8-NiS, Nippon Chemical Industrial Co.) in a 15 cm (length)×¼" (ID) stainless tubing. The column packing and conditioning are with a slurry method according to the reference (Cong, R.; Parrott, A.; Hollis, C.; Cheatham, M. WO2017040127A1). The final pressure with trichlorobenzene (TCB) slurry packing is 150 bars. The column is installed just before IR-5 detector in the detector oven. Ortho-dichlorobenzene (ODCB, 99% anhydrous grade or technical grade) is used as eluent. Silica gel 40 (particle size 0.2~0.5 mm, catalogue number 10181-3) is obtained from EMD Chemicals and can be used to dry ODCB solvent The ICCD instrument is equipped with an autosampler with nitrogen ($N_2$) purging capability. ODCB is sparged with dried $N_2$ for one hour before use. Sample preparation is done with autosampler at 4 mg/ml (unless otherwise specified) under shaking at 160° C. for 1 hour. The injection volume is 300 μl. The temperature profile of ICCD is: crystallization at 3° C./min from 105° C. to 30° C., then thermal equilibrium at 30° C. for 2 minutes (including Soluble Fraction Elution Time being set as 2 minutes), followed by heating at 3° C./min from 30° C. to 140° C. The flow rate during elution is 0.50 ml/min. Data are collected at one data point/second.

Column temperature calibration can be performed by using a mixture of the reference material linear homopolymer polyethylene (having zero comonomer content, melt index ($I_2$) of 1.0 g/10 min, polydispersity $M_{w(GPC)}/M_{n(GPC)}$ approximately 2.6 by conventional gel permeation chromatography, 1.0 mg/ml) and Eicosane (2 mg/ml) in ODCB. ICCD temperature calibration consists of four steps: (1) Calculating the delay volume defined as the temperature offset between the measured peak elution temperature of Eicosane minus 30.00° C.; (2) Subtracting the temperature offset of the elution temperature from the ICCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference has a peak temperature at 101.0° C., and Eicosane has a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content calibration curve (comonomer content in mole percent versus elution temperature (T)) of ICCD is constructed by using 12 reference materials (a linear ethylene homopolymer and 11 ethylene-octene random copolymers made with single site metallocene catalyst, having a weight average molecular weight ranging from 35,000 to 128,000 g/mol) with known comonomer contents. All of these reference materials are analyzed in the same way as specified previously at 4 mg/mL. The comonomer content in mole percent and its peak temperature on the elution curve follows $$\ln(1 - \text{comonomer content(mol \%)}) = -\frac{208.328(°C.)}{273.15(°C.) + T(°C.)} + 0.55846 \quad \text{Eq. 1}$$

Determination of Peaks and Full Width at Half Maximum on the ICCD Elution Profile A single baseline is subtracted from the IR measurement signal in order to create a relative mass-elution profile plot starting and ending at zero relative mass at its lowest and highest elution temperatures (typically between 35° C. and 119° C.). For convenience, this is presented as a normalized quantity with respect to an overall area equivalent to 1. In the relative mass-elution profile plot from ICCD, a weight fraction ($w_T(T)$) at each temperature (T) can be obtained. The profile ($w_T(T)$ vs. T) is from 35.0° C. to 119.0° C. with a temperature step increase of 0.200° C. from the ICCD, and follows $$\int_{35.0}^{119.0} w_T(T)dT = 1 \quad \text{Eq. 2}$$

On the $w_T(T)$ vs. T elution profile, a single peak is defined as a curve with one Highest Point in the middle and two Lowest Points on two sides (lower temperature side and higher temperature side). Both heights of the two Lowest Points need to be lower than the height of the Highest Point by at least 10%. If one or both of the Lowest Points have a height less than 10% lower than the height of the Highest Point, i.e. one or both of the Lowest Points have a height greater than 90% of the height of the Highest Point, such a curve is considered a shoulder associated with another peak, but is not a peak itself. Each separate peak is then measured for width in degree C. at 50% of the maximum height of that peak in the $w_T(T)$ vs. T elution profile plot. This width is called the full width at half maximum of the peak.

If the ICCD elution profile has multiple peaks, the separation points ($T_{separation}$) between the peaks can be defined as the Lowest Points of the adjacent two peaks. The weight fraction of the nth peak ($WT_{peak\ n}$) can be calculated according to the following equations $$WT_{peak\ 1} = \int_{35.0}^{T_{separation,1}} w_T(T)dT \quad \text{(Eq. 3a)}$$

$$WT_{peak\ 2} = \int_{T_{separation,1}}^{T_{separation,2}} w_T(T)dT \quad \text{(Eq. 3b)}$$

$$\ldots$$

$$WT_{peak\ n} = \int_{T_{separation,n-1}}^{119.0} w_T(T)dT \quad \text{(Eq. 3c)}$$

where the peak 1, peak 2, ..., and peak n are the peaks in the order from low temperature to high temperature, and the $T_{separation,\ n}$ is the separation point between the n peak and n+1 peak.

Full width at half maximum is defined as the temperature difference between the first intersection of the front temperature and the first intersection of the rear temperature at half of the maximum peak height of that individual peak. The front temperature at the half of the maximum peak is searched forward from 35.0° C., while the rear temperature at the half of the maximum peak is searched backward from 119.0° C.

Comonomer Distribution Constant (CDC)

Figure 1:
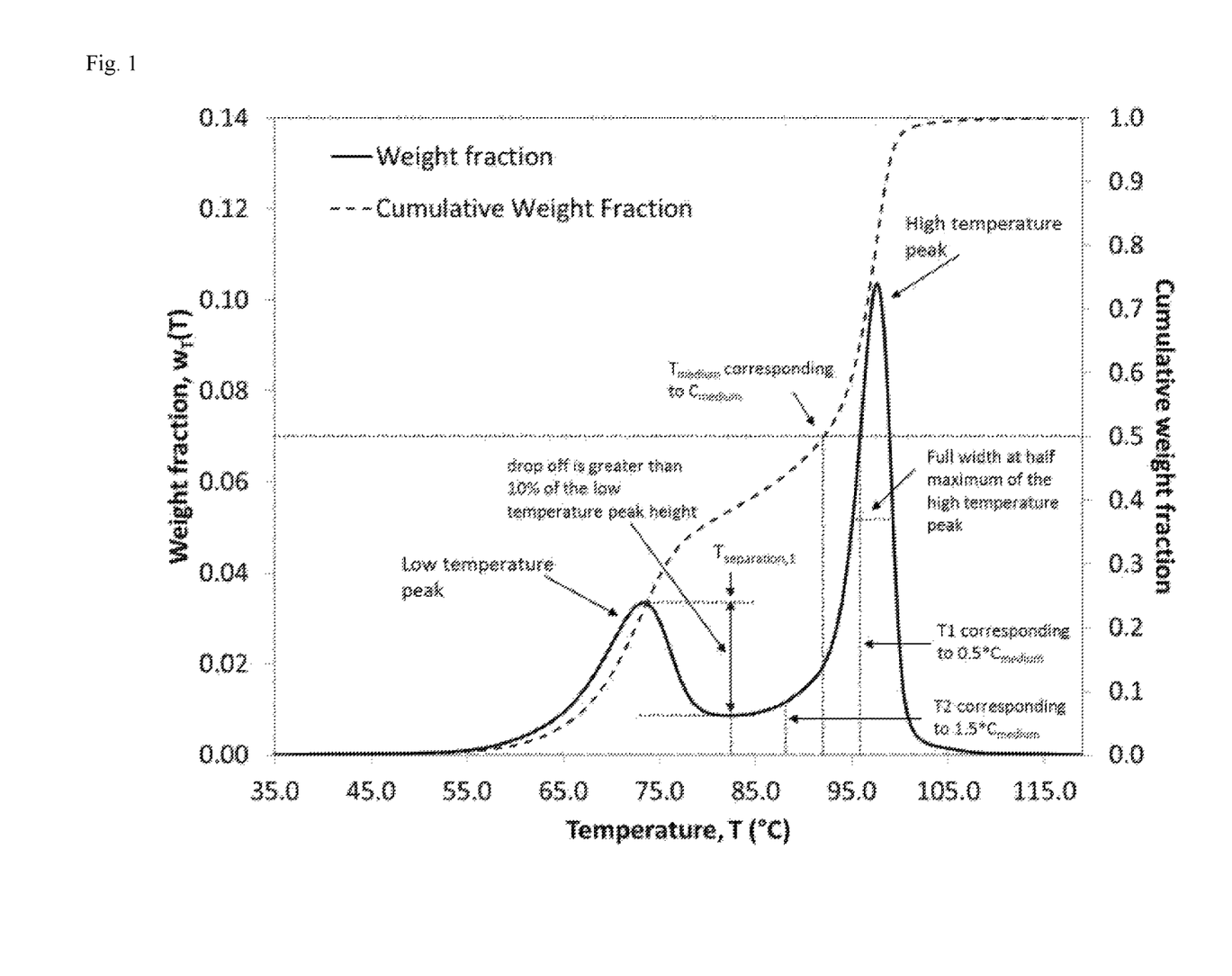
FIG. 1 is an ICCD elution plot of the ethylene/alpha-olefin composition of Sample 1.

Comonomer distribution constant (CDC) is calculated from $w_T(T)$ vs. T elution profile by ICCD according to the following steps shown graphically as FIG. 1:

(1) Obtain $w_T(T)$ vs. T elution profile from ICCD in the range from 35.0° C. to 119.0° C. with a temperature step increase of 0.200° C. Total weight fraction from 35° C. to 119° C. is normalized to 1.0 and should follow Equation 2.

(2) Calculate the median temperature ($T_{median}$) at cumulative weight fraction of 0.500, according to the following formula:

$$\int_{35.0}^{T_{median}} w^T(T)dT = 0.5 \quad \text{Eq. 4}$$

(3) Calculate the corresponding median comonomer content in mole % ($C_{median}$) at the median temperature ($T_{median}$) by using comonomer content calibration curve according to Equation 1.

(4) Composition Distribution Breadth Index (CDBI) is defined as the total weight fraction of polymer chains with a comonomer content ranging from $0.5*C_{median}$ to $1.5*C_{median}$ from 35.0° C. to 119.0° C. Find the corresponding temperature T1 for $0.5*C_{median}$ and the corresponding temperature T2 for $1.5*C_{median}$ based on Equation 1. Composition Distribution Breadth Index (CDBI) can be obtained from the weight fraction ($w_T(T)$) vs. temperature (T) plot between T1 and T2 as $\int_{T2}^{T1} w_T(T)dT$. If $T_{median}$ is higher than 98.0° C., Composition Distribution Breadth Index (CDBI) is defined as 0.95;

(5) Obtain the temperature at the maximum peak height ($T_p$) from $w_T(T)$ vs. T profile of ICCD by searching each data point for the highest peak from 35.0° C. to 119.0° C. (if the two peaks are identical in height, then the lower temperature peak is selected); When the difference in the peak temperatures is equal to or greater than 1.1 times of the sum of full width at half maximum of each peak, the Half Width of the interpolymer composition is calculated as the arithmetic average of the full width at half maximum of each peak.

If the difference in the peak temperatures is less than 1.1 times of the sum of full width at half maximum of each peak, the Half Width of the interpolymer composition is defined as the full width at half maximum of the highest temperature peak.

(6) Calculate the standard deviation of temperature (Stdev) according to the following formula:

$$Stdev = \sqrt[2]{\int_{35}^{119}(T-T_p)^2 \times w_T(T)dT} \qquad \text{Eq. 5}$$

(7) Comonomer distribution constant (CDC) is calculated from the following equation $$CDC = \frac{\text{Composition Distribution Breath Index}}{\frac{\text{Half Width}}{Stdev}} \times 100 \qquad \text{Eq. 6}$$

Conventional Gel Permeation Chromatography (Conventional GPC) and MWCDI

The chromatographic system consists of a PolymerChar GPC-IR (Valencia, Spain) high temperature GPC chromatograph equipped with an internal IR5 infra-red detector (IR5). The autosampler oven compartment is set at 160° C. and the column compartment is set at 150° C. The columns used are 4 Agilent "Mixed A" 30 cm 20-micron linear mixed-bed columns. The chromatographic solvent used is 1,2,4 trichlorobenzene and contains 200 ppm of butylated hydroxytoluene (BHT). The solvent source is nitrogen sparged. The injection volume used is 200 microliters and the flow rate is 1.0 milliliter/minute.

Calibration of the GPC column set is performed with at least 20 narrow molecular weight distribution polystyrene standards with molecular weights ranging from 580 to 8,400,000 g/mol and are arranged in 6 "cocktail" mixtures with at least a decade of separation between individual molecular weights. The standards are purchased from Agilent Technologies. The polystyrene standards are prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards are dissolved at 80° C. with gentle agitation for 30 minutes. The polystyrene standard peak molecular weights are converted to ethylene/alpha-olefin interpolymer molecular weights using the following equation (as described in Williams and Ward, J. Polym. Sci., Polym. Let., 6, 621 (1968)):

$$M_{polyethylene} \times A \times (M_{polystyrene})^B \qquad \text{(Eq. 7)}$$

where M is the molecular weight, A has a value of 0.4315 and B is equal to 1.0.

A fifth order polynomial is used to fit the respective ethylene/alpha-olefin interpolymer-equivalent calibration points. A small adjustment to A (from approximately 0.39 to 0.44) is made to correct for column resolution and band-broadening effects such that NIST standard NBS 1475 is obtained at a molecular weight of 52,000 g/mol.

The total plate count of the GPC column set is performed with Eicosane (prepared at 0.04 g in 50 milliliters of TCB and dissolved for 20 minutes with gentle agitation). The plate count (Equation 8) and symmetry (Equation 9) are measured on a 200 microliter injection according to the following equations:

$$\text{Plate Count} = 5.54 \times \left(\frac{RV_{PeakMax}}{\text{Peak Width at half height}}\right)^2 \qquad \text{(Eq. 8)}$$

where RV is the retention volume in milliliters, the peak width is in milliliters, the Peak Max is the maximum height of the peak, and half height is one half of the height of the peak maximum.

$$\text{Symmetry} = \frac{(\text{Rear Peak } RV_{onetenthheight} - RV_{Peakmax})}{(RV_{Peakmax} - \text{Front Peak } RV_{onetenthheight})} \qquad \text{(Eq. 9)}$$

where RV is the retention volume in milliliters and the peak width is in milliliters, Peak max is the maximum position of the peak, one tenth height is one tenth of the height of the peak maximum, and where rear peak refers to the peak tail at later retention volumes than the Peak max and where front peak refers to the peak front at earlier retention volumes than the Peak max. The plate count for the chromatographic system should be greater than 22,000 and symmetry should be between 0.98 and 1.22.

Samples are prepared in a semi-automatic manner with the PolymerChar "Instrument Control" Software, wherein the samples are weight-targeted at 2 mg/ml, and the solvent (contained 200 ppm BHT) is added to a pre nitrogen-sparged septa-capped vial, via the PolymerChar high temperature autosampler. The samples are dissolved for 3 hours at 160° C. under "low speed" shaking.

The calculations of $M_{n(GPC)}$, $M_{w(GPC)}$, and $M_{z(GPC)}$ are based on GPC results using the internal IR5 detector (measurement channel) of the PolymerChar GPC-IR chromatograph according to Equations 11a-c, using PolymerChar GPCOne™ software, the baseline-subtracted IR chromatogram at each equally-spaced data collection point i ($IR_i$) and the ethylene/alpha-olefin interpolymer equivalent molecular weight obtained from the narrow standard calibration curve for the point i ($M_{polyethylene,i}$ in g/mol) from Equation 7. Subsequently, a GPC molecular weight distribution (GPC-MWD) plot ($wt_{GPC}$(lgMW) vs. lgMW plot, where $wt_{GPC}$(lgMW) is the weight fraction of the interpolymer molecules with a molecular weight of lgMW) can be obtained. Molecular weight is in g/mol and $wt_{GPC}$(lgMW) follows the Equation 10.

$$\int wt_{GPC}(lgMW)dlg\ MW = 1.00 \qquad \text{(Eq. 10)}$$

Number-average molecular weight $M_{n(GPC)}$, weight-average molecular weight $M_{w(GPC)}$ and z-average molecular weight $M_{z(GPC)}$ can be calculated as the following equations.

$$M_{n(GPC)} = \frac{\sum^i IR_i}{\sum^i \left(\frac{IR_i}{M_{polyethylene,i}}\right)} \qquad \text{(Eq. 11a)}$$

$$M_{w(GPC)} = \frac{\sum^i (IR_i * M_{polyethylene,i})}{\sum^i IR_i} \qquad \text{(Eq. 11b)}$$

$$M_{z(GPC)} = \frac{\sum^i (IR_i * M_{polyethylene,i}^2)}{\sum^i (IR_i * M_{polyethylene,i})} \qquad \text{(Eq. 11c)}$$

In order to monitor the deviations over time, a flow rate marker (decane) is introduced into each sample via a micropump controlled with the PolymerChar GPC-IR system. This flow rate marker (FM) is used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 12. Processing of the flow marker peak is done via the PolymerChar GPCOne™ Software. Acceptable flow rate correction is such that the effective flowrate should be within 0.5% of the nominal flowrate.

$$\text{Flow rate}_{effective} = \text{Flow rate}_{nominal} \times (RV(FM_{calibrated})/RV(FM_{Sample})) \quad \text{(Eq. 12)}$$

A calibration for the IR5 detector ratioing can be performed using at least eight ethylene/alpha-olefin interpolymer standards (one polyethylene homopolymer and seven ethylene/octene copolymers) of known short chain branching (SCB) frequency (measured by the 13C NMR Method), ranging from homopolymer (0 SCB/1000 total C) to approximately 50 SCB/1000 total C, where total C=carbons in backbone+carbons in branches. Each standard has a weight-average molecular weight from 36,000 g/mol to 126,000 g/mol, as determined by GPC. Each standard has a molecular weight distribution ($M_{w(GPC)}/M_{n(GPC)}$) from 2.0 to 2.5, as determined by GPC. The "IR5 Area Ratio (or "IR5 Methyl Channel Area/IR5 Measurement Channel Area")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) is calculated for each of the "SCB" standards. A linear fit of the SCB frequency versus the "IR5 Area Ratio" is constructed in the form of the following equation:

$$\text{SCB}/1000 \text{ total } C = A_0 + [A_1 \times (\text{IR5}_{Methyl\ Channel\ Area}/\text{IR5}_{Measurement\ Channel\ Area})] \quad \text{(Eq. 13)}$$

where $A_0$ is the SCB/1000 total C intercept at an "IR5 Area Ratio" of zero, and $A_1$ is the slope of the SCB/1000 total C versus "IR5 Area Ratio" and represents the increase in the SCB/1000 total C as a function of "IR5 Area Ratio."

A series of linear baseline-subtracted chromatographic heights for the chromatogram generated by the "IR5 methyl channel sensor" are established as a function of column elution volume, to generate a baseline-corrected chromatogram (methyl channel). A series of linear baseline-subtracted chromatographic heights for the chromatogram generated by the "IR5 measurement channel" are established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" is calculated at each column elution volume index (each equally-spaced index, representing 1 data point per second at 1 ml/min elution) across the sample integration bounds. The "IR5 Height Ratio" is multiplied by the coefficient A1, and the coefficient A0 is added to this result, to produce the predicted SCB frequency of the sample. The result is converted into mole percent comonomer as follows in Equation 14:

$$\text{Mole Percent Comonomer} = \{SCB_f/[SCB_f + ((1000 - SCB_f * \text{Length of comonomer})/2)]\} * 100 \quad \text{(Eq. 14)}$$

where "$SCB_f$" is the "SCB per 1000 total C", and the "Length of comonomer" is the number of carbons of the comonomer, e.g. 8 for octene, 6 for hexene, and so forth.

Each elution volume index is converted to a molecular weight value (Mwi) using the method of Williams and Ward (described above; Equation 7). The "Mole Percent Comonomer" is plotted as a function of lg(Mwi), and the slope is calculated between Mwi of 20,000 and Mwi of 200,000 g/mol (end group corrections on chain ends are omitted for this calculation). Linear regression is used to calculate the slope between, and including, Mwi from 20,000 to 200,000 g/mol, wherein the height of the concentration chromatogram ($wt_{GPC}$(lgMW) vs. lgMW plot) is at least 10% of the peak height of the chromatogram. This slope is defined as the molecular weighted comonomer distribution index (MWCDI).

Zero-Shear Viscosity Ratio (ZSVR)

Zero-shear viscosity ratio is defined as the ratio of the zero-shear viscosity (ZSV) of the branched polyethylene material to the ZSV of a linear polyethylene material (see ANTEC proceeding below) at the equivalent weight average molecular weight ($M_{w(GPC)}$), according to the following equation:

$$ZSVR = \frac{\eta_{0B}}{\eta_{0L}} = \frac{\eta_{0B}}{2.29 \times 10^{-15} Pa \cdot sec \cdot \left(\frac{g}{mol}\right)^{-3.65} \times M_{w(GPC)}^{3.65}}. \quad \text{(Eq. 15)}$$

The ZSV value of the interpolymer ($\eta_{0B}$) is obtained from creep test, at 190° C., via the method described below. The $M_{w(GPC)}$ value is determined by the conventional GPC method (Equation 11b), as discussed above. The correlation between ZSV of linear polyethylene ($\eta_{0L}$) and its $M_{w(GPC)}$ is established based on a series of linear polyethylene reference materials. A description for the ZSV-$M_{w(GPC)}$ relationship can be found in the ANTEC proceeding: Karjala et al., *Detection of Low Levels of Long-chain Branching in Polyolefins*, Annual Technical Conference—Society of Plastics Engineers (2008), 66th 887-891.

Creep Test

The ZSV value of the interpolymer ($\eta_{0B}$) is obtained from a constant stress rheometer creep test at 190° C. in a nitrogen environment using DHR, TA Instrument. The samples are subjected to flow between two 25 mm diameter plate fixtures positioned parallel to each other. Samples are prepared by compression molding pellets of the interpolymer into circular plaques of about 1.5-2.0 mm thick. The plaques are further cut into 25 mm diameter disks and sandwiched between the plate fixtures of the TA Instrument. The oven on the TA instrument is closed for 5 minutes after sample loading and before setting the gap between the plate fixtures to 1.5 mm, opening the oven to trim the edges of the sample, and reclosing the oven. A logarithmic frequency sweep between 0.1 to 100 radians/second at 190° C., 300 seconds of soak time, and 10% strain is conducted before and after the creep test to determine whether the sample has degraded. A constant low shear stress of 20 Pa is applied for all of the samples, to ensure that the steady state shear rate is low enough to be in the Newtonian region. Steady state is determined by taking a linear regression for the data in the last 10% time window of the plot of "lg (J(t)) vs. lg(t)", where J(t) is creep compliance and t is creep time. If the slope of the linear regression is greater than 0.97, steady state is considered to be reached, then the creep test is stopped. In all cases in this study, the slope meets the criterion within one hour. The steady state shear rate is determined from the slope of the linear regression of all of the data points, in the last 10% time window of the plot of "E vs. t", where E is strain. The zero-shear viscosity is determined from the ratio of the applied stress to the steady state shear rate.

$^1$H NMR Method

A stock solution (3.26 g) is added to 0.133 g of the polymer sample in 10 mm NMR tube. The stock solution is a mixture of tetrachloroethane-d2 (TCE) and perchloroethylene (50:50 in weight) with 0.001M $Cr^{3+}$. The solution in the tube is purged with $N^2$, for 5 minutes, to reduce the amount of oxygen. The capped sample tube is left at room temperature, overnight, to swell the polymer sample. The sample is dissolved at 110° C. with periodic vortex mixing. The samples are free of the additives that may contribute to unsaturation, for example, slip agents such as erucamide. Each $^1$H NMR analysis is run with a 10 mm cryoprobe, at 120° C., on Bruker AVANCE 400 MHz spectrometer.

Two experiments are run to measure unsaturation: one control and one double presaturation experiment. For the control experiment, the data are processed with an exponential window function with 1 Hz line broadening and the baseline is corrected from about 7 to −2 ppm. The signal from residual 1H of TCE is set to 100, the integral (Itotal) from about −0.5 to 3 ppm is used as the signal from the whole polymer in the control experiment. The number of total carbons, NC, in the polymer is calculated as follows in Equation 16:

$$NC = I_{total}/2 \quad \text{(Eq. 16)}$$

For the double presaturation experiment, the data are processed with an exponential window function with 1 Hz line broadening, and the baseline is corrected from about 6.6 to 4.5 ppm. The signal from residual $^1$H of TCE is set to 100, and the corresponding integrals for unsaturations ($I_{vinylene}$, $I_{trisubstituted}$, $I_{vinyl}$ and $I_{vinylidene}$) are integrated. It is well known to use NMR spectroscopic methods for determining polyethylene unsaturation, for example see Busico, V., et al., *Macromolecules*, 2005, 38, 6988. The number of unsaturation unit for vinylene, trisubstituted, vinyl and vinylidene are calculated as follows:

$$N_{vinylene} = I_{vinylene}/2 \quad \text{(Eq. 17)},$$

$$N_{trisubstituted} = I_{trisubstitute} \quad \text{(Eq. 18)},$$

$$N_{vinyl} = I_{vinyl}/2 \quad \text{(Eq. 19)},$$

$$N_{vinylidene} = I_{vinylidene}/2 \quad \text{(Eq. 20)}.$$

The unsaturation units per 1,000 total carbons, i.e., all polymer carbons including backbone and branches, are calculated as:

$$N_{vinylene}/1,000\ C = (N_{vinylene}/NC)*1,000 \quad \text{(Eq. 21)},$$

$$N_{trisubstituted}/1,000\ C = (N_{trisubstituted}/NC)*1,000 \quad \text{(Eq. 22)},$$

$$N_{vinyl}/1,000\ C = (N_{vinyl}/NCH_2)*1,000 \quad \text{(Eq. 23)},$$

$$N_{vinylidene}/1,000\ C = (N_{vinylidene}/NC)*1,000 \quad \text{(Eq. 24)}.$$

The chemical shift reference is set at 6.0 ppm for the $^1$H signal from residual proton from TCE-d2. The control is run with a ZG pulse, NS=4, DS=12, SWH=10,000 Hz, AQ=1.64s, D1=14s. The double presaturation experiment is run with a modified pulse sequence, with O1P=1.354 ppm, O2P=0.960 ppm, PL9=57 db, PL21=70 db, NS=100, DS=4, SWH=10,000 Hz, AQ=1.64s, D1=1s (where D1 is the presaturation time), D13=13s.

$^{13}$C NMR Method

The samples are prepared by adding approximately 3 g of a 50/50 mixture of tetrachloroethane-d2/orthodichlorobenzene, containing 0.025 M $Cr(AcAc)_3$, to a 0.25 g polymer sample in a Norell 1001-7 10 mm NMR tube. Oxygen is removed from the sample by purging the tube headspace with nitrogen. The samples are then dissolved and homogenized by heating the tube and its contents to 150° C. using a heating block and heat gun. Each sample is visually inspected to ensure homogeneity. Samples are thoroughly mixed immediately prior to analysis, and are not allowed to cool before insertion into the heated NMR probe. This is necessary to ensure the sample is homogeneous and representative of the whole. All data are collected using a Bruker 400 MHz spectrometer equipped with a Bruker cryoprobe. The data are acquired using a 6 second pulse repetition delay, 90-degree flip angles, and inverse gated decoupling with a sample temperature of 120° C. All measurements are made on non-spinning samples in locked mode. Samples are allowed to thermally equilibrate for 7 minutes prior to data acquisition. The 13C NMR chemical shifts are internally referenced to the EEE triad at 30 ppm.

C13 NMR comonomer Content: It is well known to use NMR spectroscopic methods for determining polymer composition. ASTM D 5017-96; J. C. Randall et al., in "NMR and Macromolecules" ACS Symposium series 247; J. C. Randall, Ed., Am. Chem. Soc., Washington, D.C., 1984, Ch. 9; and J. C. Randall in "Polymer Sequence Determination", Academic Press, New York (1977) provide general methods of polymer analysis by NMR spectroscopy.

Denier Measurement

Fiber size is measured via optical microscopy. Denier (defined as the weight of such fiber for 9000 meter) is calculated based on the density of each polymer component and fiber size.

Curl

Curl is measured via optical microscopy. Curl (defined as the curvature of the fibers) is calculated based on the inverse of the radius of the approximate helix formed by fiber. This is equal to the radius of the circle formed by projection of the approximate helix formed by the fiber on a surface perpendicular to it. Average value of at least 5 samples is reported

EXAMPLES

Example 1 Synthesis of Ethylene/Alpha Olefin Polymer

All raw materials (ethylene monomer and 1-octene comonomer) and the process solvent (a narrow boiling range high-purity isoparaffinic solvent, product name Isopar-E commercially available from ExxonMobil Chemical) are purified with molecular sieves before introduction into the reaction environment. Hydrogen is supplied pressurized as a high purity grade and is not further purified. The reactor ethylene feed stream is pressurized via a mechanical compressor to above reaction pressure. The solvent and comonomer feed is pressurized via a pump to above reaction pressure. The individual catalyst components are manually batch diluted to suitable component concentrations with purified solvent and pressured to above reaction pressure. All reaction feed flows are measured with mass flow meters and independently controlled with computer automated valve control systems.

A two reactor system is used in a series configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, ethylene, hydrogen, and catalyst component feeds is possible. The total fresh feed stream to each reactor (solvent, ethylene, 1-octene, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through a specially designed injection stingers. The primary catalyst (pre-catalyst) component feed is computer controlled to maintain each reactor ethylene conversion at the specified targets. The co-catalyst components are fed based on calculated specified molar ratios to the primary catalyst (pre-catalyst) component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

In dual series reactor configuration the effluent from the first polymerization reactor (containing solvent, ethylene, 1-octene, hydrogen, catalyst components, and polymer) exits the first reactor loop and is added to the second reactor loop.

The second reactor effluent enters a zone where it is deactivated with the addition of and reaction with water. Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted 1-octene is recycled back to the reactor after passing through a purification system. A small amount of solvent and 1-octene is purged from the process.

The reactor stream feed data flows that correspond to the values in Table 1 used to produce the examples. The data are presented such that the complexity of the solvent recycle system is accounted for and the reaction system can be treated more simply as a once through flow diagram. Catalyst components used are referenced in Table 2.

The polymer made was tested for various properties according to the methods set forth above. In addition, ASPUN™ 6835 a unimodal ethylene/1-octene copolymer and ASPUN™ 6000 a bimodal ethylene/1-octene copolymer both from The Dow Chemical Company. Results are shown in Table 3.

TABLE 1

Production Conditions

| | | Ex. 1 | Ex 2 | Ex 3 |
|---|---|---|---|---|
| First Reactor Feed Solvent/Ethylene Mass Flow Ratio | g/g | 3.1 | 3.3 | 3.1 |
| First Reactor Feed 1-octene/Ethylene Mass Flow Ratio | g/g | 0.33 | 0.11 | 0.33 |
| First Reactor Feed Hydrogen/Ethylene Mass Flow Ratio | g/g | 3.3E−04 | 2.3E−04 | 2.1E−04 |
| First Reactor Temperature | °C. | 160 | 160 | 150 |
| First Reactor Pressure (gauge) | Pa | 580 | 725 | 725 |
| First Reactor Ethylene Conversion | % | 89.7 | 94.6 | 96.7 |
| First Reactor Catalyst Type | Type | Pro-catalyst 1 | Pro-catalyst 1 | Pro-catalyst 1 |
| First Reactor Co-Catalyst 1 Type | Type | Co-catalyst 1 | Co-catalyst 1 | Co-catalyst 1 |
| First Reactor Co-Catalyst 2 Type | Type | Co-catalyst 2 | Co-catalyst 2 | Co-catalyst 2 |
| First Reactor Co-Catalyst 1 to Catalyst Molar Ratio (B to Zr ratio) | Ratio | 1.2 | 1.1 | 1.3 |
| First Reactor Co-Catalyst 2 to Catalyst Molar Ratio (Al to Zr ratio) | Ratio | 39.2 | 20.5 | 25.7 |
| First Reactor Residence Time | min | 17.8 | 17.9 | 21.1 |
| Second Reactor Feed Solvent/Ethylene Mass Flow Ratio | g/g | 2.5 | 2.5 | 2.5 |
| Second Reactor Feed 1-octene/Ethylene Mass Flow Ratio | g/g | 0.134 | 0.044 | 0.103 |
| Second Reactor Feed Hydrogen/Ethylene Mass Flow Ratio | g/g | 6.3E−04 | 4.7E−04 | 3.9E−04 |
| Second Reactor Temperature | °C. | 195 | 195 | 195 |
| Second Reactor Pressure (gauge) | Pa | 580 | 725 | 740 |
| Second Reactor Ethylene Conversion | % | 91.6 | 91.9 | 91.7 |
| Second Reactor Catalyst Type | Type | Pro-catalyst 2 | Pro-catalyst 2 | Pro-catalyst 2 |
| Second Reactor Co-Catalyst 1 Type | Type | Co-catalyst 1 | Co-catalyst 1 | Co-catalyst 1 |
| Second Reactor Co-Catalyst 2 Type | Type | Co-catalyst 2 | Co-catalyst 2 | Co-catalyst 2 |
| Second Reactor Co-Catalyst 1 to Catalyst Molar Ratio (B to Zr ratio) | mol/mol | 5.5 | 7.6 | 6.9 |
| Second Reactor Co-Catalyst 2 to Catalyst Molar Ratio (Al to Zr ratio) | mol/mol | 2248.8 | 1387.0 | 1210.1 |
| Second Reactor Residence Time | min | 7.5 | 7.4 | 7.8 |

TABLE 2

Catalyst systems

Pro-Catalyst 1: [structure with Zr center, t-Bu, n-Oct, i-Pr, Ge groups]

Pro-Catalyst 2: [structure with Zr center, carbazole groups, t-Bu, t-Oct, Me, (n-Oct)Me₂Si groups]

| | |
|---|---|
| Co-catalyst 1 | bis(hydrogenated tallow alkyl)methylammonium tetrakis(pentafluorophenyl)borate(1−) |
| Co-catalyst 2 | Aluminoxanes, iso-Bu Me, branched, cyclic and linear; modified methyl aluminoxane |

TABLE 3

| Properties of the ethylene/1-octene copolymersInterpolymer | Unit | ASPUN™ 6000 | ASPUN™ 6835 | Ex. 1 | Ex 2 | Ex 3 |
|---|---|---|---|---|---|---|
| Density | g/cm$^3$ | 0.935 | 0.935 | 0.935 | 0.945 | 0.935 |
| I2 | g/10 min | 19 | 17 | 21 | 21 | 17 |
| I10/I2 | | 7.2 | 6.7 | 6.2 | 6.2 | 6.6 |
| ZSVR | | 1.4 | 1.0 | 1.2 | 1.2 | 1.3 |
| Tan δ at 1 rad/s | | 30.5 | 21.0 | 89.0 | 75.6 | 54.1 |
| Tan δ at 100 rad/s | | 2.9 | 2.8 | 3.7 | 3.5 | 3.0 |
| Ratio of Tan δ at 1 rad/s to Tan δ at 100 rad/s | | 10.4 | 7.6 | 24.1 | 21.5 | 18.2 |
| Vinyl unsaturation | per 10$^6$ total carbons | 235 | 413 | 143 | 127 | 131 |
| $M_{w(GPC)}/M_{n(GPC)}$ | | 2.7 | 3.4 | 2.3 | 2.4 | 2.3 |
| $M_{z(GPC)}/M_{w(GPC)}$ | | 2.3 | 3.7 | 1.9 | 2.0 | 2.0 |
| $M_{w(GPC)}$ | g/mol | 48737 | 57574 | 46766 | 49080 | 51068 |
| MWCDI | | −0.47 | −0.46 | 1.90 | 0.65 | 2.58 |
| CDC | | 47 | 40 | 54 | 52 | 45 |
| CDBI | % | 25 | 33 | 21 | 19 | 16 |
| Peak temperature of low temperature peak | °C. | 74.0 | — | 73.4 | 88.1 | 68.6 |
| Weight fraction of low temperature peak | % | 39.2 | — | 38.3 | 43.1 | 36.1 |
| Peak temperature of high temperature peak | °C. | 98.2 | 98.4* | 97.6 | 99.8 | 99.0 |

TABLE 3-continued

| Properties of the ethylene/1-octene copolymersInterpolymer | Unit | ASPUN™ 6000 | ASPUN™ 6835 | Ex. 1 | Ex 2 | Ex 3 |
|---|---|---|---|---|---|---|
| Weight fraction of low temperature peak | % | 60.8 | 100 | 61.7 | 56.3 | 63.3 |
| Full width at half maximum of high temperature peak | ° C. | 7.8 | 6.4 | 4.2 | 3.6 | 3.6 |

*unimodal shows only one peak.

Example 2—Preparing Fibers

Fibers are spun on a Hills Bicomponent Continuous Filament Fiber Spinning Line. Bi-component fibers having a highly eccentric core sheath configuration were made with the Exxon 3854 PP core and one of the ethylene/alpha-olefin interpolymers as the sheath. The fibers were spun on the Hills Line according to the following conditions. Extruder profiles are adjusted to achieve a melt temperature of 240° C. Throughput rate of each hole is 0.5 ghm (grams per hour per minute). A Hills Bicomponent die is used and operated at a 40/60 core/sheath ratio (in weight) with Exxon 3854 PP in one extruder and the ethylene/alpha-olefin interpolymer in another extruder. The die consists of 144 holes, with a hole diameter of 0.6 mm and a length/diameter (L/D) of 5/1. Quench air temperature and flow rate are set at 15-18° C., and 520 cfm (cubic feet per minute), respectively. After the quenching zone, a draw tension is applied on the 144 filaments by pneumatically entraining the filaments in a slot unit with an air stream. Velocity of the air stream is controlled by the slot aspirator pressure.

Table 4 shows the curvature of the bicomponent fibers made with Ex. 1, ASPUN™ 6835, and ASPUN™ 6000. The bicomponent fibers made with Ex. 1 clearly show higher curvature than the samples made with ASPUN™ 6835, and ASPUN™ 6000.

TABLE 4

Curvature of fiber examples.

| Sample ID Sheath/Core | Slot aspirator pressure (MPa) | Radius of fiber (microns) | Centroid off-set, $P_{r2}/r$ | Curvature (mm$^{-1}$) |
|---|---|---|---|---|
| Sample. 1/PP | 0.14 | 11.9 | 0.57 | 3.05 |
|  | 0.28 | 8.5 | 0.50 | 11.30 |
| ASPUN™ 6835/PP | 0.14 | 12.1 | 0.53 | 0.67 |
|  | 0.28 | 8.8 | 0.56 | 1.02 |
| ASPUN™ 6000/PP | 0.14 | 15.5 | 0.41 | 1.45 |
|  | 0.28 | 11.4 | 0.44 | 1.90 |

Example 3—Preparing Fibers

Fibers are spun on a Hills Bicomponent Continuous Filament Fiber Spinning Line. Bi-component fibers having a highly eccentric core sheath configuration were made with the Exxon 3854 PP core and one of the ethylene/alpha-olefin interpolymers as the sheath. The fibers were spun on the Hills Line according to the following conditions. Extruder profiles are adjusted to achieve a melt temperature of 210° C. Throughput rate of each hole is 0.5 ghm (grams per hour per minute). A Hills Bicomponent die is used and operated at a 40/60 core/sheath ratio (in weight) with Exxon 3854 PP in one extruder and the ethylene/alpha-olefin interpolymer in another extruder. The die consists of 144 holes, with a hole diameter of 0.6 mm and a length/diameter (L/D) of 5/1. Quench air temperature and flow rate are set at 15-18° C., and 520 cfm (cubic fit per minute), respectively. After the quenching zone, a draw tension is applied on the 144 filaments by pneumatically entraining the filaments in a slot unit with an air stream. Velocity of the air stream is controlled by the slot aspirator pressure. Curvature of fiber examples is seen in Table 5.

TABLE 5

| Sample ID Sheath/Core | Slot aspirator pressure (MPa) | Radius of fiber (microns) | Curvature (mm−1) |
|---|---|---|---|
| Sample 1/PP | 0.14 | 27.2 | 1.0 |
|  | 0.21 | 23.54 | 2.37 |
|  | 0.28 | 23.04 | 1.49 |
| Sample 2/PP | 0.21 | 25.35 | 2.0 |
| Sample 3/PP | 0.21 | 21.72 | 2.5 |
| ASPUNTM 6835/PP | 0.14 | 28.2 | 0.83 |
|  | 0.21 | 20.9 | 0.91 |
|  | 0.28 | 20.6 | 0.77 |
| ASPUNTM 6000/PP | 0.21 | 23.3 | 1.7 |

What is claimed is:

1. A curly fiber having a fiber centroid and comprising a first region having a first centroid and a second region having a second centroid wherein the first region comprises an ethylene/alpha olefin interpolymer composition in an amount of at least 75 weight percent based on total weight of the first region and wherein the ethylene/alpha olefin interpolymer composition is characterized by a low temperature peak and a high temperature peak on an elution profile via improved comonomer composition distribution (ICCD) procedure, and a full width at half maximum of the high temperature peak is less than 6.0° C. and the second region is a material comprising a polymer which is different from the ethylene/alpha-olefin interpolymer of the first region and wherein the regions are arranged such that at least one of the first centroid and the second centroid is not the same as the fiber centroid, wherein the ethylene/alpha olefin interpolymer composition is further characterized by a density in the range of 0.930 to 0.965 g/cm3, a melt index (I2) in the range of from 10 to 60 g/10 minutes, wherein the I2 is measured according to ASTM D1238, 190° C., 2.16 kg, a molecular weight distribution expressed as the ratio of the weight average molecular weight to number average molecular weight in the range of from 1.5 to 2.5, and a tan delta at 1 radian/second of at least 50, wherein the tan delta is determined at 190° C. over a frequency range from 0.1 to 100 radian/second at five points per decade interval and strain amplitude is constant at 10%.

2. The fiber of claim 1 wherein having a centroid off-set for at least one of the first or second regions of at least 0.1.

3. The fiber of claim 1 wherein the first and second regions are arranged in core sheath, side by side, segmented pie, or islands-in-the-sea structures.

4. The fiber of claim 1 wherein the weight ratio of the first region to the second region is 80:20 to 20:80.

5. The fiber of claim 1 wherein the fibers has a curvature at least 2.0.

6. The fiber of claim 1 wherein the second region comprises a polypropylene.

7. The fiber of claim 1 further comprising a third region comprising a polymer different from those in the first and second regions.

8. The fiber of claim 6 wherein the first and second regions are in a core and sheath structure where the second region is a core and the first region is a sheath.

9. The fiber of claim 6 wherein the first and second regions are arranged side by side.

\* \* \* \* \*